United States Patent [19]

Nadal

[11] 4,074,022

[45] Feb. 14, 1978

[54] CASING OF AN ELECTRIC CELL

[75] Inventor: Guy Nadal, Poitiers, France

[73] Assignee: Saft-Societe des Accumulateurs Fixes et de Traction, Romainville, France

[21] Appl. No.: 740,198

[22] Filed: Nov. 9, 1976

[30] Foreign Application Priority Data

Nov. 21, 1975 France ............................... 75.35689

[51] Int. Cl.² ............................................. H01M 2/12
[52] U.S. Cl. ....................................... 429/54; 220/209
[58] Field of Search .................... 429/54, 53; 361/433; 220/209

[56] References Cited

U.S. PATENT DOCUMENTS 3,256,117  6/1966  Howatt et al. ........................ 429/54
3,802,923  4/1974  Spanur .................................. 429/54

Primary Examiner—Donald L. Walton
Attorney, Agent, or Firm—Kenyon & Kenyon, Reilly, Carr & Chapin

[57] ABSTRACT

The invention relates to a casing of an electric cell and to a method of manufacturing the cell. The casing is fitted with a vent. The vent consists of a tongue formed in a metal portion of the casing whose inner surface is in contact with a seal; the non-detached tongue in the wall is turned towards the enclosed volume of the casing. In the case of internal overpressure, the seal is deformed and allows the interior of the electric cell to communicate with the exterior. Application to alkaline electrolyte cells.

5 Claims, 3 Drawing Figures

CASING OF AN ELECTRIC CELL

The present invention relates to a casing of an electric cell fitted with a vent.

Known electric cell casings comprise a metal can which is for example cylindrical, closed by a cover; sealing between the can and the cover is provided by an elastically deformable block, such as a seal, which is inserted between the can and the cover, before crimping or turning down of their respective edges. In order to avoid any damage to the electric cell caused by excessive internal pressure, a vent of the same type as the one described in U.S. Pat. No. 3,256,117, can be provided in the casing. This vent is constituted by an orifice formed in that portion of the metal wall of the casing whose inner surface is in contact with the seal. As long as the pressure inside the electric cell is less than a determined value, the orifice is hermetically sealed by the seal; as soon as the internal pressure reaches the said value, the seal moves away from said inner surface and the orifice allows the interior of the electric cell to communicate with the outside.

The forming of this vent requires that an orifice be provided in the can before the electric cell is assembled; this is an expensive operation which the present invention aims at avoiding.

The present invention relates to a casing of an electric cell having a metal wall whose inner surface is in close contact with an elastically deformable block which encloses a volume for active materials within the casing, the wall being provided with an orifice normally separated by said block from the enclosed volume of said casing and communicating with said enclosed volume by deformation of the block when the internal pressure reaches a determined value, wherein said orifice is in the form of a tongue cut in the metal wall and turned down towards the enclosed volume without being detached from the remainder of the wall.

The invention also relates to a method of manufacturing an electric cell comprising the previously-mentioned casing, in which said tongue is formed after complete assembly of the active components in the casing and closure of this casing.

An embodiment of the invention is described by way of example with reference to the accompanying drawing in which.

Figure 1:
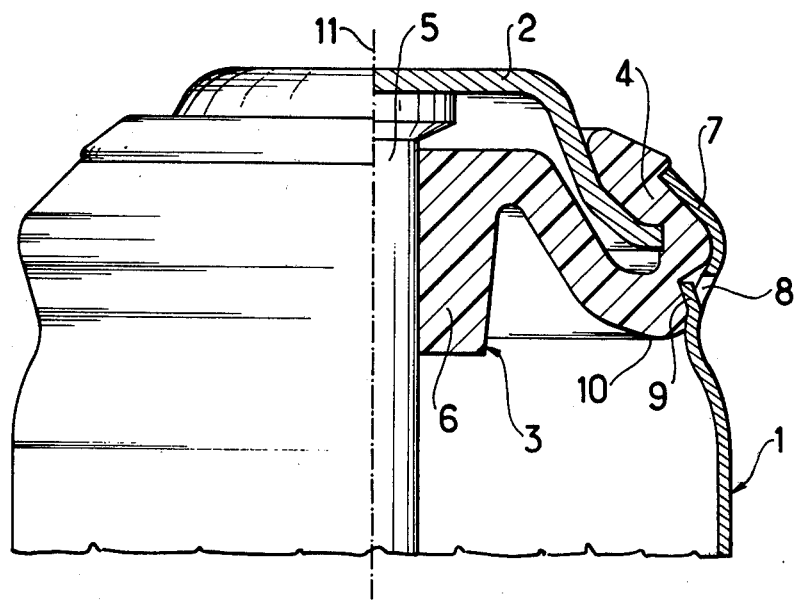
FIG. 1 is a partial half cutaway side view of an electric cell casing according to the invention, fitted with its vent.
Figure 3:
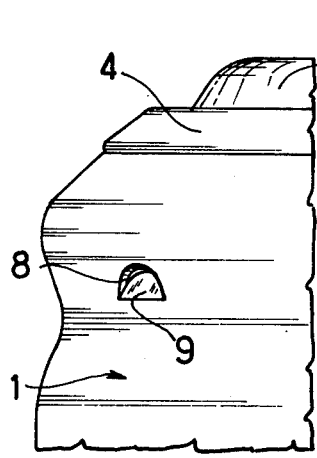
FIG. 3 is a partial elevation of the casing in FIG. 1.

The electric cell shown partly in FIG. 1 comprises a metal can 1 which is cylindrical about an axis 11, which contains the active components of the cell and which is in electric contact with the electrode of one polarity. The top part of this can is closed by a metal cover 2 in electrical contact with the electrode of the other polarity whose current collector is referenced 5. An electrically insulating and elastically deformable block 3, forming a sealing ring, comprises a skirt 6 surrounding the collector 5 and a peripheral lip 4 inserted between the edge of the cover 2 and the rim 7 of the can 1. Sealing is obtained by turning the assembly constituted by the lip 4 and the rim 7 down on the edge of the cover 2. The rim 7 in contact with the lip 4 has an orifice 8 obtained by cutting out a tongue 9 which is turned down towards the inside of the can 1 without being detached. An elevation of this tongue is shown in FIG. 3.

FIG. 1 shows the position of the seal 3 when the electric cell is not operating or when a normal pressure prevails in the can 1. The lip 4 then perfectly insulates the internal volume of the can 1 from the outside.

When the pressure increases inside the electric cell, it is evident that the lower face 10 of the seal 3 will rise until it no longer adheres to the inside wall of the flap 9 and thus until excess internal cell pressure is relieved and the seal 3 restored substantially to its initial condition it sets up a leakage path between the interior of the can and the outside. When the internal pressure decreases again, the seal 3 progressively returns to the state illustrated in FIG. 1.

The vertical position of the orifice 8 in the rim 7 and in relation to the lower face 10 of the lip 4 is chosen as a function of the maximum internal pressure tolerable inside the electric cell.

By way of an example, for an alkaline electrolyte electric cell of the type illustrated, the distance separating the lower face 10 of the seal and the top face of the cover 2 is 5.2 mm; the diameter of the orifice 8 is about 0.7 mm and the distance between the lower face 10 of the seal 3 and the axis of the orifice is 0.8 mm; the tongue is inclined at about 25° in relation to the axis 11.

The tongue is preferably turned down, i.e. in the opposite direction to that of the pressure of the gases, so that its inner surface forms a shoulder for the corresponding portion of the lip 4; the result of this is an improvement in the sealing of the casing.

Figure 2:
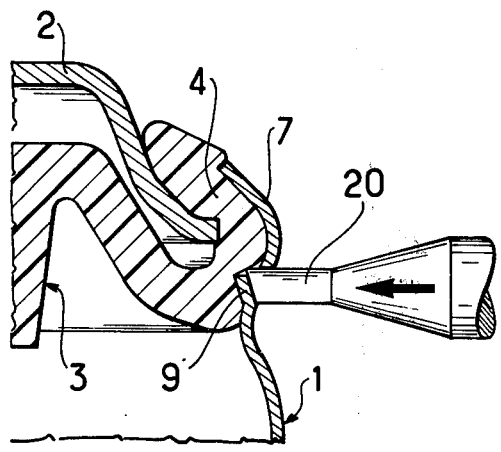
FIG. 2 is a schematic illustration of a phase of forming of the vent on the casing in FIG. 1.

The can 1 is made of a material having sufficient elasticity to enable the forming of the tongue; it is made for example of steel. As shown in FIG. 2, the flap is obtained easily by means of a punch 20 which is moved orthogonally to the axis 11. It will be seen that it is possible to form the orifice 8 after the complete assembling the electric cell, without danger of damaging the lip 4 of the seal 3.

Of course, the invention is not limited to the embodiment which has just been described. Without going beyond the scope of the invention, it would be possible to replace any means by an equivalent means. In particular, the assembly formed by the cover 2 and the seal 3 could be replaced by a plastics cover through which a terminal of the electric cell passes.

What is claimed is:

1. A casing of an electric cell, the casing including a metal wall whose inner surface is in close contact with an elastically deformable block which encloses a volume for active materials within the casing, the wall being provided with an orifice normally separated by said block from the enclosed volume of said casing and communicating with said enclosed volume by deformation of the block when the internal pressure reaches a determined value, wherein said orifice is in the form of a tongue cut in the metal wall and turned down towards the enclosed volume without being detached from the remainder of the wall.

2. A casing of an electric cell according to claim 1, wherein said metal wall belongs to a cylindrical metal can and wherein said elastically deformable block is a sealing ring separating the edge of the can from the edge of a cover which closes the can.

3. A normally sealed electric cell comprising a casing including a metal wall, an elastically deformable sealing block in close contact with an inner surface of said wall and sealingly enclosing active cell materials within said casing, said wall having therein an orifice normally separated from the enclosed volume and contents of said container by said block, said block being deformable when internal pressure in said cell rises to a determined value to provide escape communication of such pressure from said enclosed volume via said orifice, and a tongue integral with said metal wall at said orifice and turned inwardly into close contact with said block and towards said enclosed volume.

4. An electric cell according to claim 3, including a closing cover for said casing wherein said metal wall is a part of said metal casing, wherein said block is a sealing ring interposed between the edge of said cover and the edge of said casing, and wherein said orifice is sealed off by said ring at internal pressures below said determined value.

5. An electric cell according to claim 3 wherein said tongue is integral with said metal wall and offset inwardly thereof adjacent said orifice into close contact with said elastically deformable sealing block.

* * * * *